United States Patent [19]

Shafer et al.

[11] Patent Number: 5,448,049

[45] Date of Patent: Sep. 5, 1995

[54] FILM LATENT IMAGE BAR-CODE (LIBC) READER

[75] Inventors: Mark E. Shafer, Fairport; Robert W. Easterly, Churchville, both of N.Y.

[73] Assignee: Eastman Kodak Company, Rochester, N.Y.

[21] Appl. No.: 197,774

[22] Filed: Feb. 16, 1994

[51] Int. Cl.[6] .................................................. G06K 7/10
[52] U.S. Cl. ........................................ 235/462; 235/454
[58] Field of Search ................... 235/454, 375, 462; 250/570; 353/26 A, 27 A

[56] References Cited

U.S. PATENT DOCUMENTS

| | | | |
|---|---|---|---|
| 3,857,020 | 12/1974 | Higginbotham et al. | 235/61.11 E |
| 4,012,004 | 6/1990 | Imamura et al. | 355/75 |
| 4,629,876 | 12/1986 | Kubota et al. | 235/473 |
| 4,659,213 | 4/1987 | Matsumoto | 355/38 |
| 4,691,112 | 9/1987 | Wydler | 250/570 |
| 4,906,854 | 3/1990 | Rauh et al. | 250/570 X |
| 4,973,829 | 11/1990 | Ishida et al. | 235/462 |
| 5,122,645 | 6/1992 | Saeki et al. | 235/462 |
| 5,128,519 | 7/1992 | Tokuda | 235/462 X |
| 5,164,574 | 11/1992 | Ujiie et al. | 235/462 |

*Primary Examiner*—Donald Hajec
*Assistant Examiner*—Thien Minh Le
*Attorney, Agent, or Firm*—David M. Woods

[57] ABSTRACT

A latent image bar code (LIBC) reader located in relation to a filmstrip transport path for reading bar code data imprinted on the edge of a filmstrip. The LIBC reader comprises at least one illumination source and linear array of CCD elements extending transversely from one side wall of the film transport path. When suitably clocked out, each CCD element provides a signal dependent on the intensity of the illumination received. The output signals from the CCD array are processed to detect an edge of the filmstrip by the contrast in signal amplitude due to attenuation of the transmitted light intensity by the filmstrip substrate at the junction of the filmstrip with a gap separating the filmstrip edge and the side wall of the transport path. Once the edge of the filmstrip is identified, the output signals of segments of the CCD array aligned with the clock and data tracks of the bar code are sampled, digitized and compared to reference signals to discern the bar code pattern in the clock and data tracks. The bounds of the segments of CCD elements sampled are preferably set as sample time boundary functions triggered on edge detection.

19 Claims, 6 Drawing Sheets

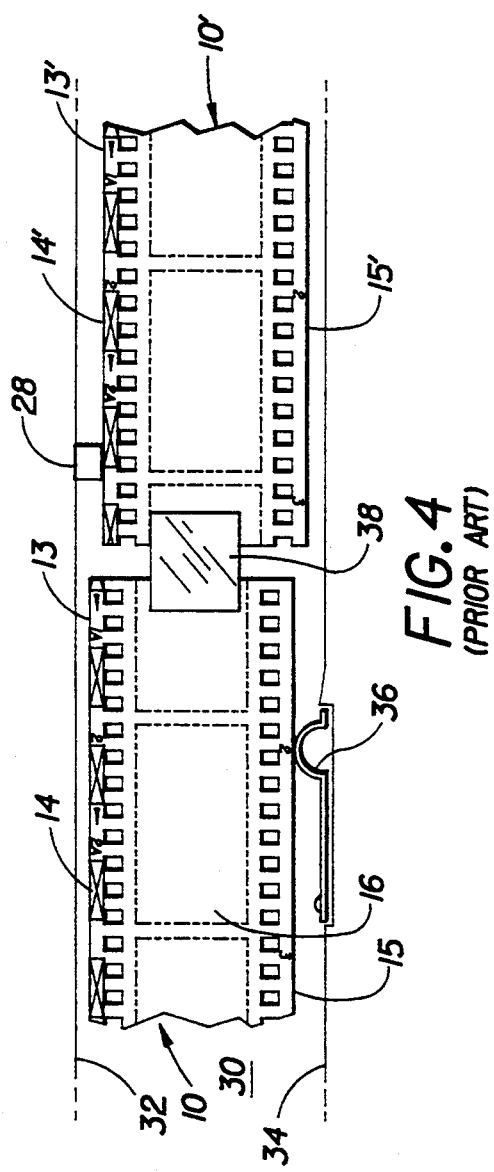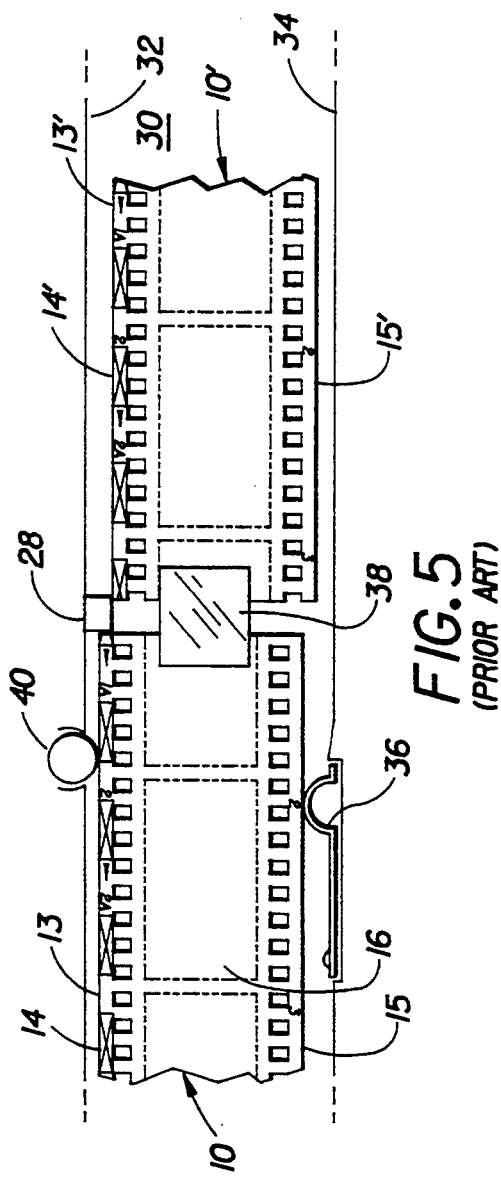

FILM LATENT IMAGE BAR-CODE (LIBC) READER

CROSS REFERENCE TO RELATED APPLICATIONS

Reference is made to: U.S. patent application Ser. No. 167,643 filed on Dec. 14, 1993, and entitled "Film Clamp For Flattening Image Frames in a Scanning Gate"; U.S. patent application Ser. No. 197,777 filed Feb. 16, 1994 and entitled "Passive Film Take-up Chamber"; U.S. patent application Ser. No. 197,775 filed Feb. 16, 1994 and entitled "Light Integrating Cavity for a Film Scanner"; U.S. patent application Ser. No. 197,778 filed Feb. 16, 1994 and entitled "Film Positioning Method and Apparatus"; and U.S. patent application Ser. No. 201,282 filed Feb. 16, 1994 and entitled "Dual Scanning Gates for a Film Scanner".

1. Field of the Invention

The present invention relates to a latent image bar code (LIBC) reader for reading bar code data imprinted on the edge of a filmstrip, and more particularly to such a reader located in relation to a filmstrip transport path that is not position-sensitive with respect to the actual edge position of the filmstrip in the transport path.

2. Background of the Invention

LIBC information is exposed onto filmstrips, e.g. 35 mm negative filmstrips, during manufacture so that photo-finishing equipment can read out the filmstrip manufacturer, product class and other identification data encoded therein after the filmstrip is processed and can use the information to assist in making prints. For example, the LIBC data includes film product and generation identification numbers, and the data is intended to be read out during subsequent operations for use in controlling functions, e.g. printing exposure time, for example, which may be automatically varied in accordance with the characteristics of the film product and the generation of the product. Other data designating the image frame number may also be contained in the LIBC on the same or the other edge of the filmstrip for use in tracking the frame. The LIBC is sometimes referred to as DX bar code; these terms are used interchangeably in the following description and claims.

A typical arrangement of LIBC clock and data tracks exposed on one edge of a filmstrip is illustrated in FIGS. 1 and 2. The bar code is exposed on the narrow segment of the filmstrip 10 between the sprocket holes 12 and the filmstrip edge 13 in a repeating pattern of blocks 14, separated by quiet zones, so that each block 14 appears at least once in relation to each image frame 16 exposed on the filmstrip 10.

The repeating bar code pattern of each block 14 is depicted in the enlargement of FIG. 2 and contains the clock track 20 and data track 22 exposed in side by side relation inwardly from the edge of the filmstrip 10. The bar code pattern for each track 20, 22 is exposed longitudinally, or along the length of filmstrip 10, and the bar code includes exit, parity, data and entry bits in the locations indicated in FIG. 2. Once the filmstrip 10 is developed, the LIBC becomes a visible pattern. The bit transitions of each track 20, 22 are represented by changing transmission density on the film (illustrated as black and white in FIG. 2).

Referring to FIG. 2, one measures the amount of light transmitted through a region on the film that is coincident with and of the same physical size as the bars representing the clock or data track bits. The region measured is referred to as the "spot read" from the film in the following description. For example, a spot of light may be focused onto the film in each track, and the transmitted spot may in turn be imaged on a photo-sensor, while the filmstrip LIBC is transported between the spot and photo-sensor.

LIBC dimensions are specified in ANSI PH.14-1990, 135-size Filmstrip and Magazine Specification. According to the specification, the minimum guaranteed data track location, measured from the filmstrip edge, is from 0.0 to 0.030 inches or 0.075 cm. The minimum guaranteed clock track location, measured from the filmstrip edge, is from 0.050 to 0.0730 inches (0.125 to 0.185 cm), or a range of 0.023 inches (0.058 cm).

Minimum to maximum filmstrip width dimensions must consider filmstrip width specification (ANSI PH1.14-1990), filmstrip shrinkage due to aging, and splicing dimensions. With these factors combined, the difference between the minimum and maximum filmstrip width exceeds 0.030 inches or 0.075 cm.

To reliably read the transmission density variations of the clock and data track bits, the spot read from the filmstrip 10 should be positioned laterally with respect to the specific location of the clock and data tracks 20, 22. The spot size should be commensurate with the bar code feature size, so that the bar transitions can be adequately resolved. However, filmstrip transport often causes misalignment between the spot focused on and the actual position of the filmstrip edge and the bar code. This problem has previously been addressed by at least three methods.

The first method aligns the spot reading means relative to one edge of the film track or path of transport which is dimensioned to a nominal filmstrip width, but allows the filmstrip to wander laterally within the track. If the film track is narrow enough with respect to the width of an actual filmstrip, the filmstrip edge will be positioned so that the clock and data tracks 20, 22 will be focused on by the spot. In actuality, the filmstrip cannot be so restrained because, such a narrow, nominally dimensioned film track would likely not pass spliced filmstrip segments commonly employed in photo-finishing operations. Moreover, tolerances in film width, shrinkage with age, and foreshortening due to film curl, will narrow the filmstrip to a point that the filmstrip edge containing the clock and data tracks 20, 22 will be out of position with respect to the spot at least part of the time. FIG. 3 illustrates the position of a filmstrip 10 in such a transport path or film track 30 between guiding side walls 32 and 34. The spot reading means 28 is fixed with respect to side wall 32 to be focused on the clock and data tracks 20, 22, but the filmstrip 10 is skewed, and data read out is incomplete or inaccurate. This method cannot be robust; the accuracy of LIBC read out will suffer.

The second method commonly employed is illustrated in FIG. 4 wherein an urging mechanism 36 bears against filmstrip edge 15 and forces the edge 13 of filmstrip 10 into contact with a side wall 32 to guide edge 13 along that side of the film track 30. In this fashion, the width of the track 30 can be greater than the width of filmstrip 10, so that spliced filmstrip samples can be advanced along the transport path. However, the urging mechanism 36 (which is depicted as an over simplification) adds mechanical complexity in guiding the filmstrip 10 and may fail to reliably do so in every instance. As depicted in FIG. 4, the ends of spliced filmstrips 10, 10' which are offset laterally at the splice 38, will not be reliably urged toward the spot reading means 28. The clock and data tracks 20, 22 of the filmstrip 10' may not be correctly read out in at least the region of the splice 38.

In the third method illustrated in FIG. 5, the filmstrip 10 is again urged by an urging mechanism 36 contacting edge 15 to force the filmstrips 16, 16' toward side wall 32 and, in this case, forcing edges 13, 13' against a guide roller 40 adjacent to the spot reading means 28. Contact with filmstrip edges 13, 13' is therefore reduced, so that the offset filmstrip segment edges adjacent to a splice 38 align to the spot sensor 28. The filmstrip 10 may be pushed to the guiding roller 40 and spot reading means 28, or, alternatively, the guiding roller 40 and spot reading means 28 may be mechanically free to follow the filmstrip edges 13, 13'. A system for moving a light source and detector bar code DX reader to follow the filmstrip edge is disclosed in U.S. Pat. No. 4,933,716. Such guiding rollers or other point contact mechanisms add further mechanical complexity (particularly in the later case), and the potential for filmstrip stubbing or jamming at offset spliced segment ends is increased.

U.S. Pat. No. 4,629,876 discloses a hybrid of the second and third method in relying on a spring loaded pivotal mechanism to urge the side walls of a film track toward one another and against the filmstrip edges to thereby keep the spot reading means aligned to the filmstrip edge bearing the bar code data blocks. Again such a mechanism may be subject to stubbing or jamming at offset spliced segment ends of filmstrip segments.

Problems to be Solved by the Invention

Consequently, a need remains for a simple sensor system and method that overcomes the problem of aligning the spot reading means to the LIBC blocks along the edge of a filmstrip to accurately read out the clock and data track information while accommodating a variety of widths of filmstrip and offset spliced end segments thereof.

SUMMARY OF THE INVENTION

It is therefor an object of the present invention to read out such bar code data from a moving filmstrip or other media without resorting to mechanisms for positioning the filmstrip or other media precisely in a path of travel with respect to an optical sensor.

It is a further object of the present invention to use non-moving sensing means for electronically determining the actual position of a bar code on a filmstrip or other media edge and reading out the bar code data and clock tracks without altering the position of either the filmstrip or other media edge or the sensing means.

These and other objects of the invention are realized in a bar code reader for line scan reading of bar code formatted information in at least one bar code track adjacent at least one edge of an elongated media, specifically a photographic filmstrip. In illustration of one intended application, the invention is summarized herein in the context of a filmstrip LIBC reader comprising the means for and steps of: transporting a filmstrip in the elongated direction in a film track having first and second sides for allowing limited lateral displacement of the filmstrip in the film track during transport to accommodate variations in filmstrip width; directing light in a path extending a predetermined distance laterally across the film track from the first side for illuminating at least a portion of the filmstrip including the bar code along a first edge of the filmstrip and for illuminating any gap between the first edge of the filmstrip and the first side of the film track; providing light responsive means formed in a linear array for providing a plurality of discrete electrical output signals varying as a function of the intensity of light impinging thereon; and positioning the linear array of light responsive means in fixed relation to the first side of the film track to extend a predetermined distance laterally across the filmstrip. Such linear array of light responsive elements being adapted to provide discrete output signals varying as a function of the intensity of light transmitted through the gap and the bar code track of a filmstrip located at any lateral position in the film track.

Preferably, the bar code reader further comprises means for and steps of the detecting the first edge of the filmstrip and reading out the discrete output signals representative of the modulation of light intensity by the bar code in the bar code track in response to the detection of the first edge.

Preferably, the linear array of light responsive means comprises a linear Charge-Coupled-Device CCD array that provides an output signal at each CCD photo-sensitive element sequentially, dependent on the intensity of the illumination impinging thereon. The output signal is processed to detect the first edge of the filmstrip by the contrast in signal amplitude due to attenuation of the transmitted light intensity by the filmstrip substrate at the junction of the filmstrip with the gap.

Once the edge of the filmstrip is identified, the output signals of segments of the CCD array aligned to the clock and data tracks are sampled, digitized and compared to reference signals to discern the bar code pattern in the clock and data tracks. The bounds of the segments of CCD elements sampled for each track are preferably set as sample time boundary functions triggered on edge detection.

Preferably, the first film track side wall is configured with respect to the illumination source and CCD linear array to block a first segment of the CCD elements from receiving any light at all to thereby provide a "black level" or zero output signal level and to expose a second segment of the CCD elements to full intensity light in at least a minimum gap between the first edge of the filmstrip and the first edge contact means to provide a "white level" or 100% output signal level. The zero and 100% output signal levels provide feedback control signals to avoid drift in illumination level and to ensure adequate discrimination in signal levels effected by the bar code patterns of light transmissivity variations in the density of the filmstrip that convey the encoded information.

In a further aspect of the invention, the light source and CCD linear array may be duplicated to extend laterally from the other film track wall to provide for reading the LIBC on the filmstrip in cases where the filmstrip is imprinted with different information, e.g. the frame number, as described above. The decoded LIBC data is employed to identify the type and content of the information. In addition, when two LIBC readers are so employed, it is to determine when the negative filmstrip is being transported upside down, that is, for example, with the emulsion side up rather than down, or when the filmstrip is inserted wrong end first. In such cases, the scenes captured in the image frames will be backward and will be scanned and recorded backward. The scanner can be alerted to this situation, and the filmstrip scanning may be averted or the digitized data may be reversed so that the subsequently produced image is correctly oriented.

Advantageous Effects of the Invention

Advantageously, there are no moving parts to the self scanning line-scan sensing means of the present invention. No effort need be made to mechanically force any alignment of the bar code tracks to a fixed spot or line-scan sensing means, or to adjust the location of a movable spot or line-scan sensing means by the methods of the prior art described earlier. The film track may be set widely enough to accommodate the widest tolerances of manufactured filmstrip width and offset between adjacent spliced together filmstrips to avoid stubbing. The filmstrips may wander in the film track from side wall to side wall with sampling being triggered by edge detection to only sample signals corresponding to the bar code tracks. The bar code reading method and apparatus of the present invention dynamically locates the filmstrip edge as the filmstrip moves laterally in the track, so that the bar code data tracks may be reliably read.

Adjustment of the sampling times may be effected electronically to fine tune the discrimination between adjacent bar code tracks. Moreover, the illumination intensity may be adjusted dynamically with respect to the CCD sensitivity during each line scan reading by reference to the 100% and zero signal levels established during each line scan.

The LIBC reader of the present invention may be employed in both film scanners, film printers or other filmstrip handling apparatus. Moreover, it is applicable to reading bar code recorded in other media that is translucent to a degree allowing differentiation of the bar code bits by light transmission.

BRIEF DESCRIPTION OF THE DRAWINGS

Other objects, advantages and features of the present invention will become apparent from the following specification when taken in conjunction with the accompanying drawings in which like elements are commonly enumerated and in which:

FIG. 4 is an illustration of a filmstrip guiding mechanism known in the prior art for alignment of the LIBC data blocks with respect to a fixed spot reading means;

FIG. 5 is a further illustration of a filmstrip guiding mechanism known in the prior art for alignment of the LIBC data blocks with respect to a fixed spot reading means;

DETAILED DESCRIPTION OF THE PREFERRED EMBODIMENT

As set forth above, LIBC and 35 mm filmstrip width dimensions are specified in ANSI Standards adopted by the camera and film manufacturing and photo-finishing industries to provide universal dimensional uniformity. However, due to the factors described above, filmstrips vary in size and are difficult to maintain in relation to spot reading means. In accordance with the present invention, it is recognized that any spot reading means or method which is to accurately read the LIBC should reference the filmstrips' edge. This is accomplished in accordance with the present invention by using a line scanning sensing means and method, and arranging the line-scan across the filmstrip width. In effect, the reading spot is moved, instead of the filmstrip or the spot reading means and film track.

Figure 6:
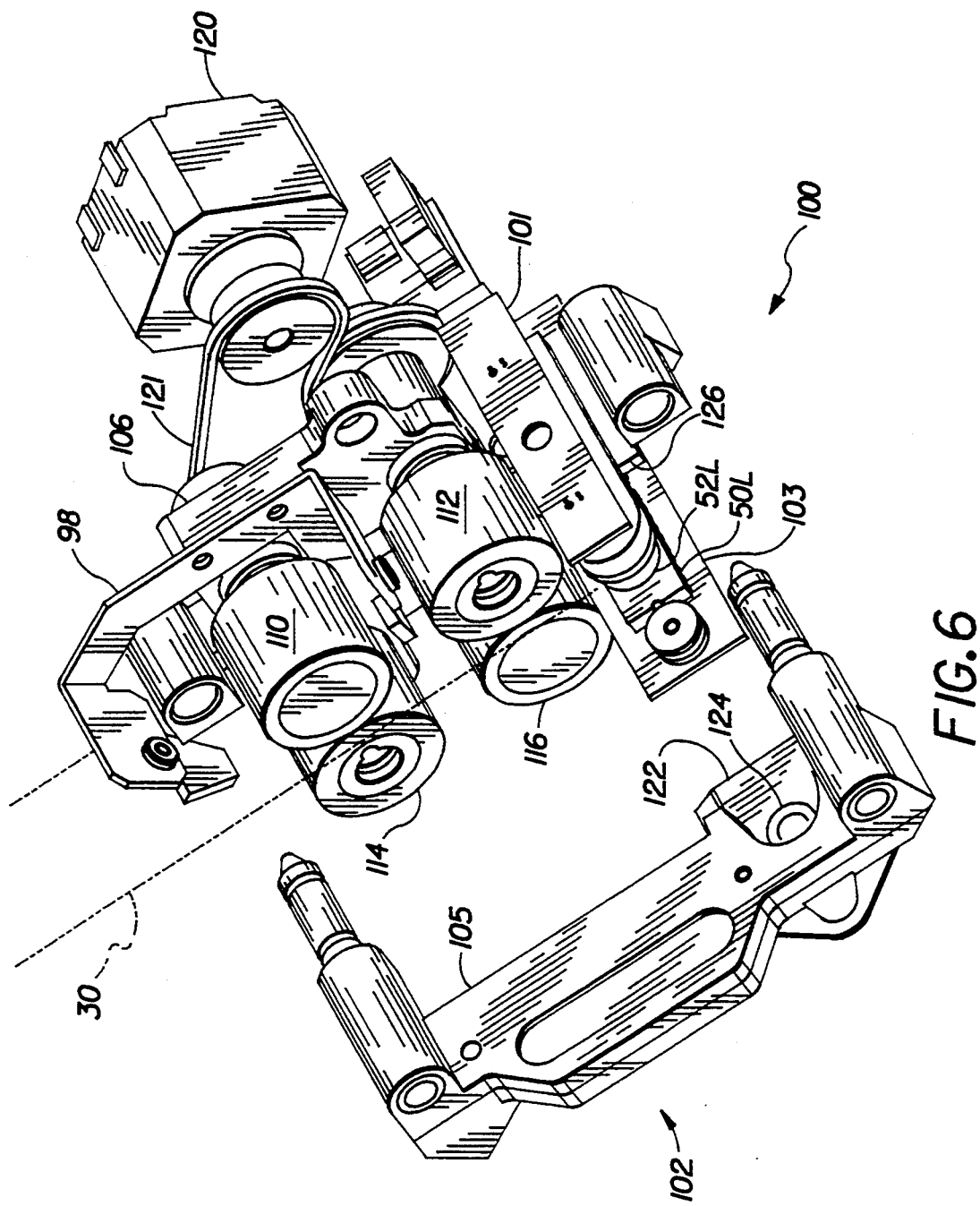
FIG. 6 is an exploded perspective view of a particle transfer roller assembly including right and left filmstrip edge illumination sources and linear scanning arrays in one preferred embodiment of the present invention.

The line-scan sensing means and method can be implemented in many ways. Generally, as shown in FIG. 6, it contemplates positioning a self-scanning, linear, electro-optic sensor to extend laterally from one or both sides, e.g. the side 32 depicted in FIGS. 2-5, of the film track or transport path 30 toward the other side, e.g. side 34 as depicted in FIGS. 2-5, a sufficient distance to overlap the blocks 14 and the adjacent sprocket holes no matter where the filmstrip 10 is being transported in the track 30. The self-scanning, linear electro-optic sensor is preferably at least one linear array 50L of CCD elements on which the images of the clock and data tracks 20 and 22 of the filmstrip LIBC blocks 14 are projected. A contact scanning method is adequate to project the image of the filmstrip's LIBC blocks 14 onto the CCD linear array 50R, because the resolving requirement is on the order of 0.002 to 0.010 inches (0.005 to 0.025 cm). Such a contact scanning arrangement is depicted in FIG. 6.

FIG. 6 is a perspective drawing of a particle transfer roller (PTR) assembly 100 employed in a film scanner of the type disclosed in the above-referenced copending applications in which the present invention may be implemented. The PTR assembly 100 is described particularly and in context with other components of the film scanner in the above-referenced (Docket 69,651) application. The PTR assembly 100 comprises PTR upper drive rollers 110, 112, PTR lower drive rollers 114, 116, and PTR drive motor 120 all mounted on a PTR frame 106. Rollers 112 and 114 are driven by PTR drive motor 120 through a drive belt 121. Two infrared, retro-reflective sensors (not shown) attached to bracket 98, which is in turn mounted to the PTR frame 106, are used to detect film inserted into the assembly.

The PTR rollers 110–116 are formed of a low durometer (23 Shore A) urethane to which dust and fiber particles on the filmstrip are transferred, thereby effecting a cleaning of the image frames prior to scanning.

The rollers 110–116 do not tend to transfer particles onto the next filmstrip but are intended to be periodically cleaned.

The PTR assembly frame 106 also includes the left film guide 102 that is separable as shown to gain access to the film track 30 indicated approximately in FIG. 6. The inner edge 105 thereof defines the left side of the film track 30 when the detachable film guide 102 is snapped into attachment with the frame 106. The frame 106 also defines the right side of the film track 30 (obscured by the rollers), and filmstrips are advanced between the left and right sides by operation of the PTR drive motor 120.

The PTR assembly frame 106 also supports the upper mounting board 101 for the right and left edge LEDs, above the film track 30 and the lower mounting board 103 for the CCD linear arrays extending from the track sides inward toward one another below the film track 30. The filmstrip passes in the PTR film track between the right and left LEDs and CCD linear arrays attached to the upper and lower mounting boards 101 and 103. In the perspective view of FIG. 6, only the left hand LED 52L and a portion of the left hand CCD linear array 50L are visible, but it will be understood that the right hand LED and CCD array extend inward on the upper and lower mounting boards 101 and 103.

The right ends of the upper and lower mounting boards 101 and 103 are secured to the PTR assembly frame 106. The left ends are fitted into the left film guide 102. When the left ends are fitted in, the masking plate 122 fits in between the LED 52L and the CCD linear array 50L. The opening 124 is aligned with the LED 52L to pass light through it onto a section of the CCD linear array 50L and across the left film track edge area. The masking plate 122 obscures a left-most, first short section of CCD elements of the CCD linear array 50L from receiving any light to establish a "black" signal level for reasons described below. The opening 124 in masking plate 122 is covered by a transparent window (not shown) which extends to the left of the film track. The window insures that the filmstrip left edge cannot cover a second short section of CCD elements of the CCD linear array 50L, which therefore receives full light intensity, to establish a "white" signal level for reasons described below.

A similar arrangement is provided for masking and fully exposing sections the right hand CCD linear array employing the masking plate 126 through which light from the right hand LED is directed on the right edge of the film track. The filmstrip passes over the left and right masking plates.

In such contact scanning as provided by the arrangement of FIG. 6, the filmstrip 10 is transported in the film track 30 in close proximity to the CCD linear arrays. In effect, the shadow of the LIBC block 14 in the filmstrip edge region is cast onto sections of CCD elements of one or the other of the CCD linear arrays by the respective LED illumination source located on the other side of the filmstrip 10, depending on how the filmstrip 10 was inserted into the film track (i.e., with the emulsion side up or down, or with the frame number sequence increasing or decreasing).

The specific configuration depicted in FIG. 6 for mounting the sensor components is illustrative of a particular preferred embodiment. However, it should be understood that the sensors as described more generally below may be incorporated in a simpler assembly without the PTR components. The following description is directed to both the particular embodiment depicted as well as other implementations of the principles of the invention.

Two considerations taken into account in choosing the distances between the illumination sources the filmstrip 10 and the CCD linear arrays are the magnification effects and blurring effects due to limitations of a finite illumination source area. Diffraction effects are clearly not important for the resolutions considered. These considerations are described in reference to the light ray trace geometry drawings of FIGS. 7 and 8.

Figure 7:
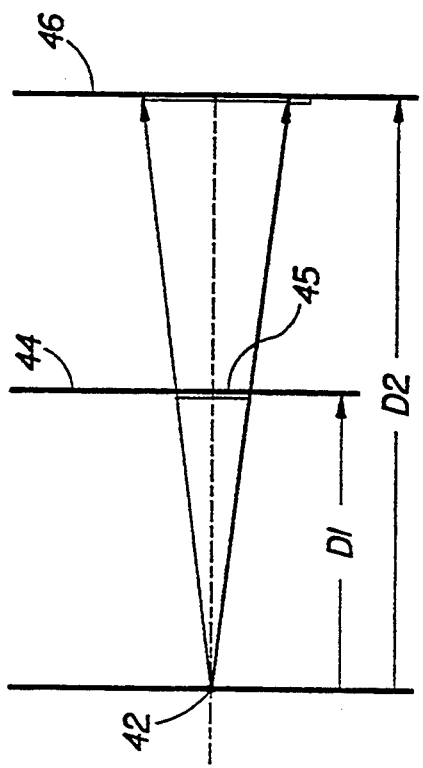
FIG. 7 is a first light ray trace geometry illustration of a point source of light casting a shadow of a density bar in a film plane on a linear array of light sensing elements.

In FIG. 7, an idealized point source of light 42 at a distance $D1$ from the filmstrip plane 44 and a distance $D2$ from the CCD linear array plane 46, will cast a shadow of an image feature on the filmstrip, in this case a finite length bar 45 of higher density than the film base, onto a segment comprising a number of CCD elements of the CCD linear array in plane 46, and the shadow of bar 45 is magnified in length by $D2/D1$. For equidistant separations, $D2$ is twice as great as $D1$, and the magnification is 2 x. If the filmstrip in plane 44 can be held in contact with the CCD linear array in plane 46, so that $D2=D1$, then the magnification would be 1 x.

Figure 8:
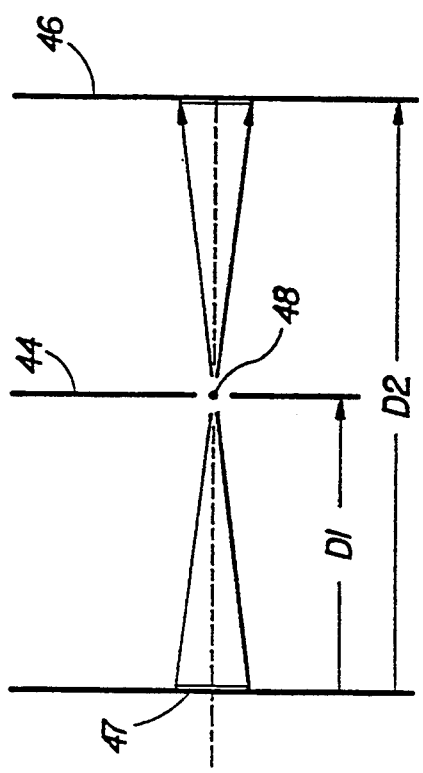
FIG. 8 is a second light ray trace geometry illustration of a finite source of light casting a shadow of an idealized density point in a film plane on a linear array of light sensing elements.

FIG. 8 shows that a finite light source 47 introduces blurring of each image point 48 in the film plane 44 as the image point shadow in plane 46 is magnified. The effective blur circle diameter at the CCD linear array plane 46 is the illumination source diameter 47 multiplied by $(D2-D1)/D1$. Thus, if the filmstrip surface in plane 44 is in contact with the surface of the CCD linear array in plane 46, the blur circle diameter at the CCD linear array plane would be zero, since $D2-D1=0$.

By using small area illumination sources and placing them at a relatively large distance $D1$ from the filmstrip 10 (in comparison to the filmstrip plane to the CCD linear array plane distance $D2-D1$), each CCD linear array can be placed a mechanically comfortable distance from the filmstrip 10 and have high resolution. In the preferred embodiment, the point source of illumination is about 0.3 mm by 0.3 mm, the distance $D1$ is about 2.4 cm, and the distance $D2-D1$ is about 0.6 cm. The film track is constructed with a gap of about 0.1 cm, so that the thickness of a filmstrip 10 can pass through the film track. While the film strip is typically much thinner than this, splice or other tape-like material attached to the strip may increase the thickness to almost 0.09 cm.

The spectral content of the illumination sources is also important to the resolution of the system. The LIBC maximum density when developed into a visible DX bar code is specified to be 0.5 above the filmstrip base minimum density in the red color spectrum, using status M densitometry. Thus, a broad-band illumination source may reduce modulation, since the yellow and magenta dyes are not guaranteed to be present. This suggests a 650 to 700 nm source of illumination. (The cyan dye of negative color film typically peaks at approximately 700 nm; thus slightly higher modulation might be achieved by using a source on-peak).

A commonly available source having small light-emitting area and a 650–700 nm spectral output is a high-brightness, red LED, of which there are presently many varieties. Radiometry considerations show there is enough optical power to allow reasonable CCD element integration times and film strip velocity.

A further consideration is the number and density distribution of the active elements of the CCD linear arrays and the physical length thereof. The number, distribution and overall length should be great enough to accommodate the width of the blocks 14 and the sprocket holes 12 to be scanned, the possible lateral motion of the filmstrip, and the tolerances of positioning the CCD linear arrays with respect to the film track 30 during assembly.

In a preferred embodiment of the invention illustrated in FIG. 6, the CCD linear arrays are commercially available Toshiba TCD132D CCD linear arrays having 1024 discrete elements over a length of 1.43 cm. The integration time for the CCD elements is about 1.25 ms, and the clock frequency is about 1 MHz.

By meeting these simple requirements, the scanning system can be assembled without regard for precise alignment of the filmstrip edges 13, 15 with respect to the CCD linear arrays and without resorting to any of the alignment methods of the prior art. Somewhere within the line-scan length, the filmstrip edge 13 or 15 and blocks 14 are guaranteed to be imaged on a sufficient number of the elements of the CCD linear array. The LIBC clock and data tracks 20 and 22 can be read out as the filmstrip 10 is transported past those elements. This holds true even if the filmstrip 10 is so highly skewed in the film track 30 that the shadow cast by the LIBC clock and data tracks 20 and 22 shift laterally over the length of a single block 14.

Figure 10:
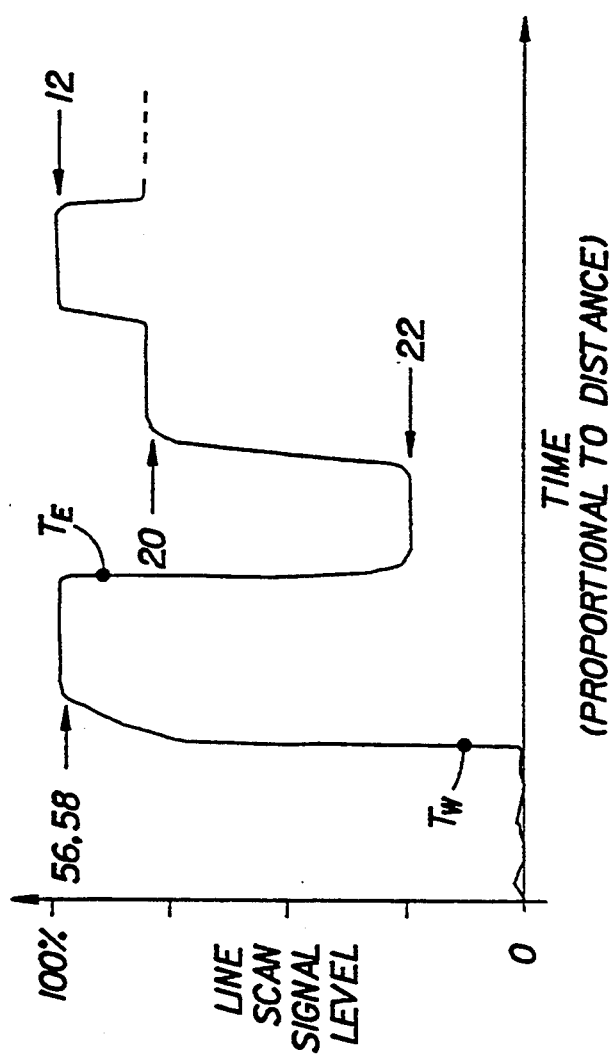
FIG. 10 is an illustration of the analog signal output amplitudes derived in scanning across the filmstrip in the direction depicted in FIG. 9.
Figure 9:
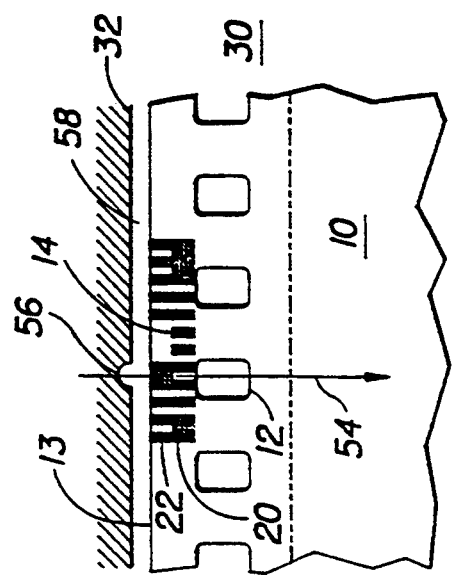
FIG. 9 is an illustration of the use of the linear array line scan reading means and method of the present invention to self-scan the filmstrip edge and the clock and data tracks regardless of the actual position of the filmstrip in the film track.

Turning now to FIGS. 9 and 10, they illustrate the manner in which the line scan reading means and method reads the clock and data tracks 20 and 22 and detects the filmstrip edge and sprocket holes by the amplitude of the line scan read signals clocked out of the elements of the CCD linear array. The scan line effected by the CCD linear array is represented by the scan line 54 in FIG. 9 away from the side wall 32. Scan line 54 indicates both the orientation of the CCD linear array 50R or 50L and the scanning direction of clocking out the discrete element, line scan read signal levels.

A first section of the CCD elements is outside the side wall 32 and the cut-out 56 (corresponding to the opening 124 in FIG. 6), and the output signal levels of that section of CCD elements represents the black level. Alternatively, the black level may be sensed from the so-called CCD light shield or dark photo-sites typically incorporated in CCD linear arrays.

The second section of CCD elements is positioned over the cut-out 56 formed in the side wall 32 so that un-modulated light from illumination source is always directed onto that section regardless of the position of the filmstrip edge 13 to provide the white level output signals so that edge discrimination may be accomplished as described below. The illumination source 52R or 52L is below the filmstrip 10 and directed through the cut-out 56, any gap 58 between the side wall 32 and the filmstrip edge 13, the clock and data tracks 20 and 22, the sprocket holes 12 (when present in the scan line) and a portion of the image frame 16.

FIG. 10 illustrates the signal output levels of the sections of CCD elements of the linear array onto which the shadow of the filmstrip 10 is cast along the scan line 54 of FIG. 9. The intensity of the line scan read signal depicted in FIG. 10 is expressed as a percentage of the maximum white level signal output from unmodulated light source intensity striking the second section of CCD elements (or 100%). The variation depicted is along the scan line 54 length and varies from zero to 100%, where zero output is that of the first section of elements of the CCD linear array that are in or on the side wall 32 and receive no light. The variation in electrical signal output percentage of the CCD elements in each section thereof depicted in FIG. 10 directly corresponds to the modulation of the light by the dark and clear LIBC clock and data track patterns that appear after the 100% white level signal output of the CCD elements aligned to the cut-out 56 and the gap 58, if the latter is present. The initial 100% signal output thus varies in width from a minimum corresponding to the width of the cut-out 56 to a maximum including whatever gap 58 is present.

The 100% white level signal output rises from the black level through a white level threshold $T_E$ and then drops to one of two lower levels at the filmstrip edge 13. In FIG. 9, a dark bar code appears in the data track at the edge 13, and the attenuation of the transmitted light causes a signal level drop at 22 as shown in FIG. 10. However, the clock track 20 does not include a dark bar code in the scan line depicted and the signal level rises at 20 in FIG. 10.

The edge 13 may be detected by the signal level drop from the white level past a threshold level $T_E$ to either of the two lower levels depicted in FIG. 10 following the 100% output level of the second section of the CCD elements. Thus, it is only necessary to detect the transition in the sequentially scanned or clocked out CCD element signal level from 100% past the threshold to positively detect the filmstrip edge 13 in the line scan signal. Then the discrimination of dark and light bar code data bits is effected from the scanned output signal levels of the next two sections of CCD elements. This may be accomplished by setting up sampling timing windows for each track that are triggered on edge detection.

The sprocket hole 12 may be detected, if present, by the transition of the line scan signal level above the threshold back to 100% output (at 12 in FIG. 10) at a time which corresponds to the physical dimension assigned to the edge-to-sprocket hole distance, and by a similar transition below the threshold at a time which corresponds to the dimension assigned to the sprocket hole width. However, it is not necessary to do so, and any signal level beyond the clock data segment may be ignored.

Before describing how the limits of the clock and data tracks are identified and correctly read out, another consideration of the benefit of providing the 100% signal level is now referred to. It is desirable to be able to sample, hold and measure the un-modulated 100% transmittance signal level during each line scan read of the CCD elements as the filmstrip is transported in the film track 30. By doing this, the system gain (for example, the drive to the LED illumination source 50L) can be adjusted so as to provide an adequate and constant signal level to effect filmstrip edge discrimination. Thus, with this output signal available, it is possible to apply closed-loop servo techniques to maintain the system gain over time.

The same sampled and held maximum output signal can also be voltage-divided to set the threshold $T_E$ for detecting the filmstrip edge 13 in the line-scan signal levels. This allows the 100% output signal to vary in absolute voltage level, while the edge detection threshold is maintained at a constant percentage of the 100% maximum. In this regard, the filmstrip base minimum density is specified to be in the range of 0.2 to 0.5 density. To ensure the proper detection of a 0.2 density edge, the threshold is set at 0.1 density or about 80% of the maximum signal output level.

Knowing when (in time) the filmstrip edge is detected from the line-scan signal allows the proper sampling of the clock and data tracks 20 and 22. This is possible since the LIBC dimensions, the CCD linear array dimensions and pixel frequency, and the optical magnification are all known.

For example, the distance from the filmstrip edge 13 to the far edge of the clock track 20 may be derived from the ANSI Standards as a range of 0.0495 to 0.0730 inches or 0.125 to 0.185 cm (taking into account perforations). Assuming a magnification of 1.25, (filmstrip-to-CCD linear array), this range becomes 0.062 to 0.091 inches (0.157 to 0.232 cm), at the CCD element surface. Assuming a 14 μm CCD pitch and sampling clocked at 1 μsec per pixel, a delay of 112 to 165 μsec from the time of edge detection would correspond to the time during which the line scan signal of the clock track would be measured. By measuring this time delay with programmable logic, and enabling separate clock and data sample and hold circuits, the respective LIBC clock and data tracks 20 and 22 can be accurately read in those time periods.

Figure 11:
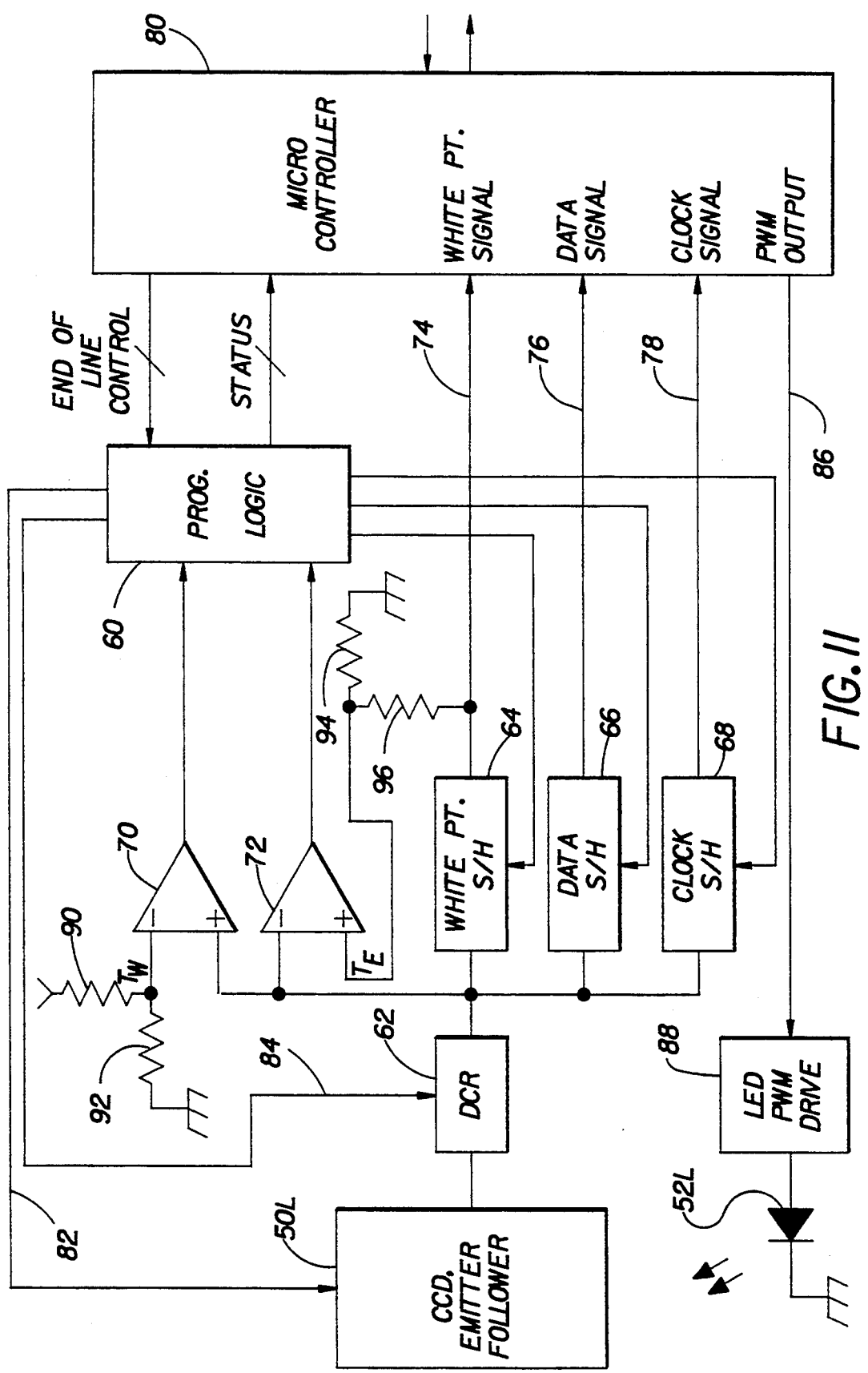
FIG. 11 is a circuit block diagram for decoding data from a CCD linear array and controlling the operation of the line scan bar code reader in accordance with the invention.

A circuit schematic for controlling the line scanning of the clock and data tracks and reading out the bar code therein in accordance with the above described principles is shown in FIG. 11 with respect to the linear array 50L and LED 52L. The FIG. 11 circuit is duplicated (except for the micro-controller 80) when a second CCD linear array and the LED are included in the system, as in the embodiment of FIG. 6.

In the context of the film scanner described in the above-referenced U.S. patent application Ser. Nos. 197,778 and 197,777, the components of the circuit of FIG. 11 (except the CCD linear arrays and LEDs) are mounted on a LIBC controller board, and the micro-controller 80 is the LIBC controller board micro-controller.

In this regard, the film scanner disclosed in the above-referenced U.S. patent application Ser. Nos. 197,778 and 197,777 is provided with a scanner computer that is inter-connected with an external computer having a keyboard and monitor. The external computer is loaded with operating software that provides instruction prompts to the operator and responds to operator commands to operate the film scanner while monitoring the status and operating modes of the scanner computer. The scanner computer includes the film handling micro-controller board controlling operation of the filmstrip and slide handling, a film scanning micro-controller board controlling various operations of the scanning station and translation of the scanning gate frame, and the LIBC controller board handling operations of the latent image bar code reader.

The film handling micro-controller includes a microprocessor which responds to sense and status signals from various sensors and provide motor control signals for stepper drive motors associated with the filmstrip handling apparatus. The filmstrips are transported by the PTR roller assembly described above into a filmstrip clamp and scanning gate, where filmstrip drive roller assemblies drive the filmstrip through or into and from the scanning station during pre-scanning and main-scanning operations.

The LIBC controller board of FIG. 11 receives commands from the film handling micro-controller when a filmstrip is entering the LIBC reader assembly to initiate LIBC reading. In this regard, a filmstrip sensor is mounted in the PTR assembly that detects the leading end of a filmstrip being advanced by the PTR rollers and provides that signal to the film handling micro-controller. The LIBC clock and data tracks are decoded by the LIBC micro-controller 80, and the DX data is transferred to the film handling micro-controller to provide image frame numbers for image frame positioning.

The image frame number data and other data related to the film characteristics are also applied to the film scanning micro-controller for use in color correction in scanning image frames. The decoded DX data is also transferred from the film scanning micro-controller to the external computer.

The DX data as to film type, manufacturer and generation transmitted to the external computer is used by resident software to color correct the line scan data to the color display characteristics of the monitor in a manner well known in the art to provide realistic color display of the image if it were to be printed.

Returning to FIG. 11, a programmable logic block 60 of the LIBC controller board is used to generate timing signals for clocking the CCD linear array 50L. Block 60 enables the DC Restore (DCR) circuit 62 during the period of time corresponding to the "black level" of the line scan signal. The servo within DCR 62 adjusts the black level to zero volts in a manner well known in the art. The programmable logic block 60 also enables the 100% or "white level" sample and hold (S/H) circuit 64 as well as the data and clock S/H circuits 66 and 68. Comparators 70 and 72 derive identifications of the signal level transitions to the white level and the filmstrip edge level in the output signal of the CCD linear array 50L so that the programmable logic 60 may provide the enable signals at appropriate times during each line scan. The sampled signal levels are transmitted to micro-controller 80 on lines 74, 76 and 78.

The micro-controller 80 generates the feedback control signal governing the light intensity that is fed on PWM line 86 to the LED PWM drive circuit 88 which in turn drives LED light source 52L. The programmable logic block 60 also provides a status signal to and receives a start scan line control signal from the micro-controller 80.

The CCD linear array 50L has integral clock drivers, an on-chip, pixel-rate, video clamp and sample/hold circuit. These functions can be externally accomplished if a simpler CCD linear array 50L is used.

The video signal coming from the CCD linear array is buffered by an emitter follower and applied to the line-rate DCR 62. The DCR 62 incorporates a low pass filter with inverting gain. The DCR output is the "line scan signal" referred to in previous description with respect to FIGS. 9 and 10.

The DCR output is then fed in parallel to the white point comparator 70 and filmstrip edge comparators 72 and to the three S/H circuits 64, 66 and 68. A fixed threshold $T_w$ voltage set to detect the beginning of the rising edge of the 100% voltage, white level signal in the line-scan signal output of the DCR 62 is applied to the other input of comparator 70 at the junction of resistors 90 and 92. The output of comparator 70 is fed to the programmable logic block 60, which enables the white point S/H 64 after a short delay.

The filmstrip edge comparator 72 also has a second input coupled to a threshold $T_E$ voltage through resistors 94 and 96. This adaptive threshold $T_E$ voltage is set to 80% of the white point S/H output signal level or 80% of the maximum white point. The output signal of comparator 72 is fed to the programmable logic block 60 and is used to generate the two enable signals for the data and clock, S/H circuits 66 and 68, respectively, at the times and for durations derived as described above to separately enable read out of the data and clock tracks.

It is useful to "slow down" the closed-loop response for the clock and data, S/H circuits 68 and 66, since they should be "averaging" over the 0.020 inch or so of guaranteed LIBC data and clock track widths. It is important for each S/H circuit 64, 66 and 68 to have the same gain. This is done by using a common closed-loop unity gain topology for each.

Each of the three analog output signals of the S/H circuits 64, 66 and 68 are applied on respective conductors 74, 76 and 78 to the micro-controller 80 which has an integral analog multiplexor (MUX) and analog to digital converter (ADC). The micro-controller 80 digitizes the three analog output signals in real time as each signal appears during enablement of the respective S/H circuit by the programmable logic 60. The micro-controller 80 also controls the line period, sending an end-of-line control signal to the programmable logic block 60 at the lapse of a time period. The micro-controller 80 also can sense status conditions from the programmable logic block 60 for each scanning line, e.g. "filmstrip edge not found" if edge comparator 72 does not output a signal on the transition from white level through the edge detect threshold and to either of the levels 22 or 20 depicted in FIG. 10.

Micro-controller 80 also controls the drive current to the LED 52L via pulse width modulation in the LED PWM drive circuit 88. In this fashion, the micro-controller 80 can adjust the output voltage derived on line 74 representing the white point to the desired voltage level corresponding to 100% in FIG. 10.

Turning to the completion of scanning of a single block 14, successive scan lines of analog signals are presented on lines 74, 76 and 78 to the micro-controller 80 as the filmstrip is advanced and the CCD elements of the linear CCD array 50L are exposed to successive shadow images in the manner described above. Line scans are repeated at intervals in excess of the 1.25 ms integration time. As each line scan is completed, the micro-controller 80 derives a set of digitized data bit values corresponding to the DX bar code imprinted in the clock and data tracks 20 and 22 and decodes that data to derive the recorded data in a manner well known in the art.

Figure 1:
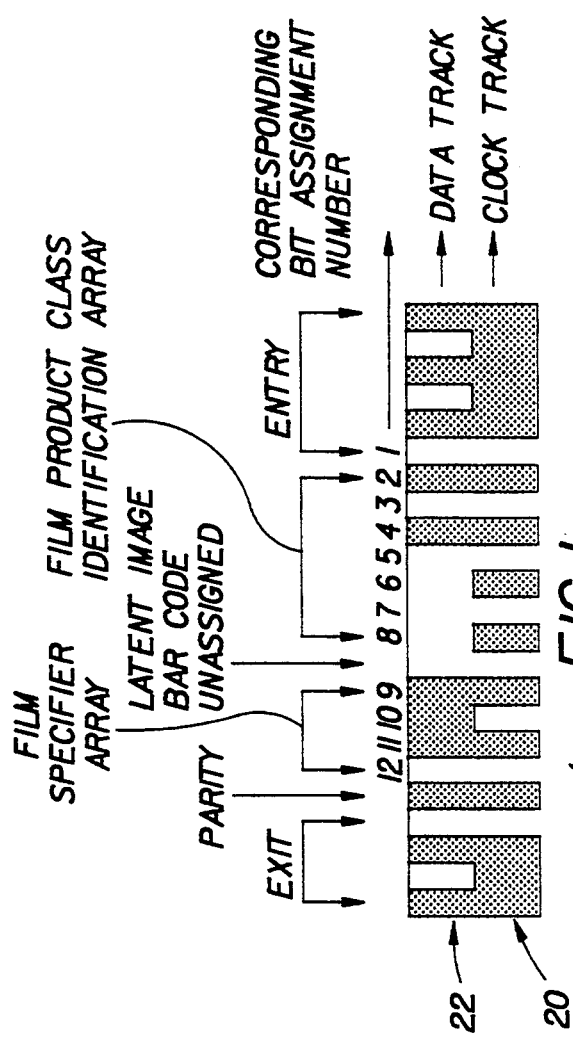
FIG. 1 is an illustration of a filmstrip segment having LIBC data blocks along one edge thereof of a type known in the prior art.
Figure 3:
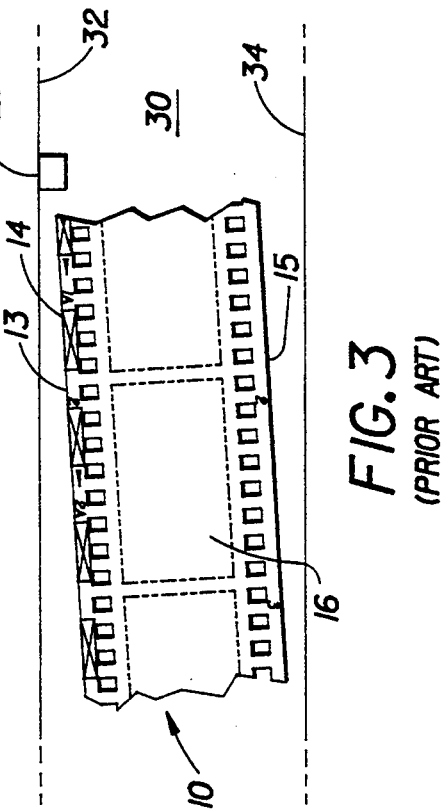
FIG. 3 is an illustration of a filmstrip positioned in a film track with respect to a fixed spot reading means of a type known in the prior art.
Figure 2:
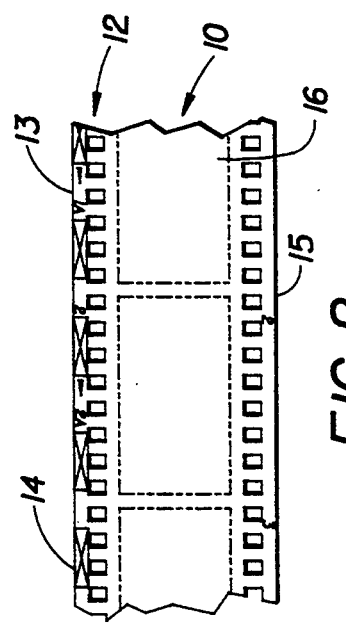
FIG. 2 is an illustration of the size and format of LIBC clock and data tracks in each block of FIG. 1.

The line scan linear array sensing means and method of the present invention employing the circuitry of the type depicted in FIG. 11 may be used to decode blocks 14 following the format depicted in FIG. 2 or may be also used to decode other data, e.g. frame number data that certain manufacturers may record in LIBC on the other filmstrip edge 15.

In either case, the use of the left and right hand LEDs and CCD linear arrays and the circuitry described above allows the micro-controller to determine whether the filmstrip is being transported emulsion side up or down. The filmstrip may be inserted by the operator either side up. If the emulsion is the wrong side up, then the images presented for scanning are backward from the scene captured. For example, printed text would appear backward after the image is recorded in other media, e.g. Photo CD or in hard print copies, or displayed as a video image. In accordance with this aspect of the invention, the micro-controller 80 can set a flag that the images on the filmstrip are backward and the image frame may be scanned in a backwards direction to correct the mistake or the field of scanned image data may be inverted by the data processor to then record, print or display the image in its proper orientation. Alternatively, the filmstrip may be ejected and the operator alerted to re-position the filmstrip for scanning.

In addition, the filmstrip may be inserted with the wrong end first, which may affect the scanned image. During decoding of the LIBC tracks from either of the CCD linear arrays, the micro-controller 80 will immediately determine whether the "entry" and "exit" codes of the clock and data tracks are in the proper order. If they are inserted in reverse order, the film scanner may be commanded to scan the images in a corrected order. Alternatively, the filmstrip may be ejected and the operator alerted to re-position the filmstrip.

The various aspects of the present invention have been described in detail in reference to a film scanner for scanning and digitizing filmstrip image frame data. It will be understood that the invention has other applications, e.g. to accurately detect and decode LIBC or DX data on filmstrips advanced through color printers or other film processing equipment. Moreover, it may have application to reading indicia of various types recorded from an edge or edges of other media than negative filmstrips and for other purposes than described herein.

Although the LED(s) and CCD linear array(s) described are arranged for light transmission through the filmstrip and modulation by the shadow cast by the density of the film base and bar code, it will be understood that they may be arranged optically in other orientations. Alternate light sources and line scan means may be used, and they may be used on other media in either light reflection or transmission modes. The shadows cast by reflection of light from a bar code pattern may be detected by a suitable arrangement of the LED(s) and CCD linear array(s) on the same side of the filmstrip or other media.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–11 filmstrip(s) 10, 10'
sprocket holes 12, 12'
filmstrip edge(s) 13
block(s) 14, 14'
opposite filmstrip edge(s) 15, 15'
image frame(s) 16, 16'
clock track 20
data track 22
spot reading means 28
transport path or film track 30
guiding side walls 32 and 34
urging mechanism 36
splice 38
guiding roller 40
point source of light 42
film plane 44
finite length bar 45
CCD linear array plane 46
illumination source diameter 47 image point 48
CCD linear arrays 50R, 50L
LED illumination sources 52R, 52L
scan line 54
cut-out 56
gap 58
programmable logic block 60
filmstrip edge sensor 61
line-rate DC restore circuit (DCR) 62
100% or "white level" S/H circuit 64
data and clock S/H circuits 66 and 68
white point comparator 70
edge comparator 72
lines 74, 76 and 78
micro-controller 80
CCD control line 82
DCR enable line 84
PWM output line 86
LED PWM drive circuit 88
threshold voltage resistors 90 and 92
threshold voltage resistors 94 and 96
bracket 98
PTR assembly 100
upper mounting board 101
left film guide 102
lower mounting board 103
inner edge 105
frame 106
PTR rollers 110, 112, 114, 116
drive motor 120
left masking plate 122
opening 124
right masking plate 126

We claim:

1. A bar code reader for reading bar code data optically imaged in a photosensitive emulsion layer for forming image frames on one surface of an elongated photographic filmstrip having first and second edges, the bar code data extending in at least one track along at least one of said first and second edges of said photographic filmstrip and being manifested by a bar code track of normal and low light transmissivity densities in said processed emulsion layer that are distinguishable optically and convey information, said bar code reader comprising:

a film track having first and second sides for restraining lateral movement of a filmstrip, said first and second sides positioned apart to define a film track width that is wider than the nominal width of said filmstrip for allowing limited lateral displacement of said filmstrip in said film track during transport to accommodate variations in filmstrip width;

means for transporting said filmstrip in the elongated direction in said film track in a correct or incorrect orientation with the emulsion layer either up or down, thereby positioning said bar code track adjacent said first or said second edge, and/or may position said filmstrip reversed in elongated direction in said film track;

first bar code reading means disposed with respect to said first side for reading said bar code data of said filmstrip transported in said film track with said emulsion layer facing down; and second bar code reading means disposed with respect to said second side for reading said bar code data of said filmstrip transported in said film track with said emulsion layer facing up, said first and second bar code reading means further comprising:

illuminating means positioned in relation to said first and second sides for directing light in paths extending a predetermined distance laterally across said film track from said first and second sides for illuminating at least a portion of said filmstrip including said bar code track extending along a filmstrip edge thereof, when present, and for illuminating any gap between said filmstrip edge and said first and second sides;

light responsive means formed in first and second linear arrays of light responsive elements for providing first and second pluralities of discrete electrical output signals varying as a function of the intensity of light impinging on each light responsive element in each array; and means for positioning said first and second linear arrays in fixed relation to said first and second sides and extending a predetermined distance laterally across said film track sufficiently that said first and second linear arrays provide said first and second pluralities of discrete output signals varying as a function of the intensity of light transmitted through said bar code track of said filmstrip located at any lateral position in said film track adjacent either said first or said second film track side.

2. The bar code reader of claim 1 wherein:

said illuminating means respectively comprise first and second LEDs positioned along said first and second film track sides to direct emitted light toward one surface of a filmstrip transported in said film track;

said first and second linear arrays comprise CCD linear arrays of discrete CCD elements that are each charged to a charge signal level as a function of the quantity of light falling thereon; and said positioning means supports said first and second CCD linear arrays to orient at least a section of the discrete CCD elements of each of said first and second CCD linear arrays toward the light emitted by said first and second LED, respectively, and the other surface of said filmstrip transported in said film track so that light transmitted through said filmstrip edge, including said bar code pattern, if present, and any gap between the adjacent filmstrip edges and film track sides falls on said sections of discrete CCD elements of each CCD array.

3. The bar code reader of claim 2 wherein said positioning means of each of said first and second CCD linear arrays further comprises:

means for extending said first and second CCD linear arrays predetermined distances laterally across said film track such that a first section of said CCD elements of each CCD linear array is exposed to the light emitted by the respective LED and are charged to a high charge signal level, and a second section of said CCD elements extending across said film track in each CCD linear array is exposed to the light emitted by said respective LED except as modulated by the presence of said filmstrip in said track including said bar code pattern along said filmstrip edge, whereby CCD elements in the second section of one of said first or second CCD linear arrays are charged to first and second intermediate charge signal levels in response to normal and low light transmissivities, respectively, of said bar code pattern.

4. The bar code reader of claim 3 wherein each of said first and second bar code reading means further comprises:

first means for repetitively sampling said discrete CCD element charge signal levels in a linear sampling sequence as said filmstrip is transported in said film track; and second means for distinguishing said pattern of first and second intermediate charge signal levels corresponding to the filmstrip bar code pattern among the sampled charge signal levels in each linear sampling sequence regardless of the position of the filmstrip edge and bar code track with respect to said second section of CCD elements.

5. The bar code reader of claim 4 further comprising:
means responsive to said second means for determining that said filmstrip is oriented with the emulsion side up or down.

6. The bar code reader of claim 4 further comprising:
means responsive to said second means for determining that said filmstrip is transported in the proper or improper direction in said film track.

7. The bar code reader of claim 4 wherein each of said first and second bar code reading means further comprises:

means for repetitively clocking said discrete CCD element charge signal levels in a linear clocking sequence as said filmstrip is transported in said film track;

means operative during each repeated linear clocking sequence for deriving a high signal level sample point from the read out high charge signal levels of said first section of CCD elements;

means for establishing a filmstrip edge detect reference signal level from said high signal level sample point;

means operative following establishment of said filmstrip edge detect reference signal for detecting a filmstrip edge when a charge signal level read out from a third section of CCD elements falls below said filmstrip edge detect reference signal level;

means responsive to each detection of said filmstrip edge for sampling said charge signal levels of said third section of CCD elements following said edge detect, whereby said first and second intermediate charge signal levels effected by said bar code pattern are read out.

8. The bar code reader of claim 7 wherein:
said extending means further comprises means for masking an initial number of said first section of said CCD elements from light emitted by said LED, whereby the initial number of CCD elements are charged to a low charge signal level;

and wherein said means operative during each repeated linear clocking sequence for deriving a high signal level sample point from the high charge signal levels of said first section of CCD elements is responsive to the transition from said low charge signal level to said high charge signal level for sampling said high charge signal level.

9. A bar code reader for reading bar code data formed in a bar code track along an edge of an elongated photographic filmstrip in relation to filmstrip image frames, the bar code extending in at least one track along said filmstrip edge being manifested by a bar code pattern of light transmissivity densities in said filmstrip that are distinguishable optically and convey information when decoded, said bar code reader comprising:

a film track having first and second sides for restraining lateral movement of a filmstrip, said first and second sides positioned apart to define a film track width that is wider than the nominal width of said filmstrip for allowing limited lateral displacement of said filmstrip in said film track during transport to accommodate variations in filmstrip width;

means for transporting a filmstrip in the elongated direction in said film track;

illuminating means positioned in relation to at least said first side for directing light in a path extending a predetermined distance laterally across said film track from said first side for illuminating at least a portion of said filmstrip including said bar code track extending along said filmstrip edge thereof and for illuminating any gap between said filmstrip edge and said first side;

light responsive means formed in a linear array of light responsive elements for providing a plurality of discrete electrical output signals varying as a function of the intensity of light impinging on each light responsive element; and means for positioning said linear array of light responsive means in fixed relation to said first side and extending a predetermined distance laterally across said film track from said first side sufficiently that said light responsive means may provide a plurality of discrete output signals varying as a function of the intensity of light transmitted through said gap and said bar code track of said filmstrip located at any lateral position in said film track;

said illuminating means comprises an LED positioned along said film track first side to direct emitted light toward one surface of a filmstrip transported in said film track;

said light responsive means comprises a CCD linear array of discrete CCD elements that are each charged to a charge signal level as a function of the quantity of light falling thereon; and said positioning means comprises a support for said CCD linear array that orients at least a section of the discrete CCD elements toward the light emitted by said LED and the other surface of said filmstrip transported in said film track so that light transmitted through said filmstrip edge, including said bar code pattern, if present, and any gap between said filmstrip edge and said film track side falls on said section of discrete CCD elements, said positioning means further comprising means for extending said CCD linear array a predetermined distance laterally across said track such that a first section of said CCD are exposed to the light emitted by said LED and are charged to a high charge signal level, and a second section of said CCD elements extending across said track are exposed to the light emitted by said LED except as modulated by the presence of said filmstrip in said track including said bar code pattern along said filmstrip edge and are charged to first and second intermediate charge signal levels in response to normal and low light transmissivities, respectively, of said bar code pattern.

10. The bar code reader of claim 9 wherein said bar code reader further comprises:

means for repetitively clocking said discrete CCD element charge signal levels in a linear clocking sequence as said filmstrip is transported in said film track; and means for distinguishing said pattern of first and second intermediate charge signal levels corresponding to the filmstrip bar code pattern among the sampled charge signal levels in each linear clocking sequence regardless of the position of the filmstrip edge and bar code track with respect to said second section of CCD elements.

11. The bar code reader of claim 9 wherein said bar code reader further comprises:

means for repetitively clocking said discrete CCD element charge signal levels in a linear clocking sequence as said filmstrip is transported in said film track;

means operative during each repeated linear clocking sequence for deriving a high signal level sample point from the high charge signal levels of said first section of CCD elements;

means for establishing a filmstrip edge detect reference signal level from said high signal level sample point;

means operative following establishment of said filmstrip edge detect reference signal for detecting a filmstrip edge when a charge signal level read out from said second section of CCD elements falls below said filmstrip edge detect reference signal level;

means responsive to each detection of said filmstrip edge for sampling said charge signal levels of said second section of CCD elements following said edge detect, whereby said first and second intermediate charge signal levels effected by said bar code pattern are read out.

12. The bar code reader of claim 11 wherein:

said extending means further comprises means for masking an initial number of said first section of CCD elements from light emitted by said LED, whereby the initial number of CCD elements are charged to a low charge signal level;

and wherein said means operative during each repeated linear clocking sequence for deriving a high signal level sample point from the high charge signal levels of said first section of CCD elements is responsive to the transition from said low charge signal level to said high charge signal level for sampling said high charge signal level.

13. A bar code reader for reading bar code data from a bar code formed in a one or more bar code tracks on an elongated media, the bar code extending along a media edge in at least one track and being manifested by a bar code pattern of light modulating variations in said media that are distinguishable optically and convey data, said bar code reader comprising:

means for transporting said media in the elongated direction in a track having sides spaced apart to allow limited lateral displacement of said media in said track during transport to accommodate variations in media width;

a light source positioned in relation to said track for directing light in a path extending a predetermined distance laterally across said track from a side thereof for illuminating at least the portion of said media including said bar code along said media edge and for illuminating any gap between said media edge and said track side;

a linear array of CCD elements for providing a plurality of discrete charge signals varying in signal level as a function of the intensity of light impinging thereon;

means for positioning said linear array in fixed relation to said track side and said light source and for extending said linear array a predetermined distance laterally across said track from said track side such that a first section of said CCD elements extending linearly outside said track side are obscured from said light source, a second section of said CCD elements extending linearly outside said track side are exposed to the full intensity of illumination by said light source, and a third section of said CCD elements extending across said track are exposed to full intensity illumination except as modulated by the presence of said media positioned in said track including said bar code along said media edge; and means for sampling said plurality of discrete charge signal levels in a linear sampling sequence and for reading said bar code data varying as a function of the intensity of light transmitted through said gap and modulated by said bar code regardless of said gap between said media edge and said track side.

14. The bar code reader of claim 13 further comprising:

means for setting an edge detection threshold signal;

means for comparing said plurality of discrete charge level signals to said edge detection threshold signal in order to detect said media edge; and means for reading out the discrete output signals representative of the modulation of light intensity by said bar code in said bar code track in response to the detection of said first edge.

15. The bar code reader of claim 14 further comprising:

means for sampling said plurality of discrete output signal levels in a linear sampling sequence and for reading said bar code data varying as a function of the intensity of light transmitted through said gap and modulated by said bar code regardless of the width of the gap between said media edge and said track side.

16. A bar code reader for reading bar code data from a bar code formed in a one or more bar code tracks along an edge of an elongated media, said bar code being manifested by a bar code pattern of light modulating variations in said media that are distinguishable optically and convey data, said bar code reader comprising:

means for transporting said media in the elongated direction in a track having sides spaced apart to allow limited lateral displacement of said media in said track during transport to accommodate variations in media width;

illuminating means positioned in relation to said track for directing light in a path extending a predetermined distance laterally across said track from a side thereof for illuminating at least the portion of said media including said bar code along said media edge and for illuminating any gap between said media edge and said track side;

light responsive means formed in a linear array of a plurality of light responsive elements for providing a plurality of discrete output signals varying in signal level as a function of the intensity of light impinging thereon;

means for positioning said linear array of light responsive means in fixed relation to said media edge and said illuminating means and for extending said linear array a predetermined distance laterally across said track from said track side; and means for sampling said plurality of discrete output signal levels in a linear sampling sequence and for reading said bar code data varying as a function of the intensity of light transmitted through said gap and modulated by said bar code regardless of said gap between said media edge and said track side.

17. The bar code reader of claim 16 further comprising:

means responsive to said discrete output signals for detecting said edge of said media and providing an edge detect signal; and wherein said sampling means further comprises:

means responsive to said edge detect signal and said discrete output signals for sampling signal levels representative of the modulation of light intensity by said bar code in said bar code track.

18. A bar code reader for reading bar code data formed in a bar code track along an edge of an elongated photographic filmstrip in relation to filmstrip image frames, the bar code extending in at least one track along said filmstrip edge being manifested by a bar code pattern of light transmissivity densities in said filmstrip that are distinguishable optically and convey information when decoded, said bar code reader comprising:

a film track having first and second sides for restraining lateral movement of a filmstrip, said first and second sides positioned apart to define a film track width that is wider than the nominal width of said filmstrip for allowing limited lateral displacement of said filmstrip in said film track during transport to accommodate variations in filmstrip width;

means for transporting a filmstrip in the elongated direction in said film track;

illuminating means positioned in relation to at least said first side for directing light in a path extending a predetermined distance laterally across said film track from said first side for illuminating at least a portion of said filmstrip including s,aid bar code track extending along said filmstrip edge thereof and for illuminating any gap between said filmstrip edge and said first side;

light responsive means formed in a linear array of light responsive elements for providing a plurality of discrete electrical output signals varying as a function of the intensity of light impinging on each light responsive element;

means for positioning said linear array of light responsive means in fixed relation to said first side and extending a predetermined distance laterally across said film track from said first side sufficiently that said light responsive means provides a plurality of discrete output signals varying as a function of the intensity of light transmitted through said gap and said bar code track of said filmstrip located at any lateral position in said film track;

means for setting an edge detection threshold signal;

means for comparing said plurality of discrete output signals to said edge detection threshold signal in order to detect an edge of said filmstrip; and means for reading out the discrete output signals representative of the modulation of light intensity by said bar code in said bar code track in response to the detection of said edge.

19. The bar code reader of claim 18 further comprising:

means for sampling said plurality of discrete output signal levels in a linear sampling sequence and for reading said bar code data varying as a function of the intensity of light transmitted through said gap and modulated by said bar code regardless of the width of the gap between said filmstrip edge and said first track side.

* * * * *